United States Patent [19]
Wier

[11] Patent Number: 6,000,110
[45] Date of Patent: *Dec. 14, 1999

[54] BUCKLE FOR SAFETY BELTS IN VEHICLES

[75] Inventor: Franz Wier, Göggingen, Germany

[73] Assignee: TRW Occupant Restraint Systems GmbH, Alfdorf, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/669,155

[22] Filed: Jun. 24, 1996

[30] Foreign Application Priority Data

Jun. 29, 1995 [DE] Germany .................. 295 10 590 U

[51] Int. Cl.⁶ ............... A44B 11/00; H01H 3/00
[52] U.S. Cl. ............... 24/633; 24/602; 24/603; 24/637
[58] Field of Search .............. 24/633, 603, 602, 24/637, 655, 664; 297/468; 200/61.58 B

[56] References Cited

U.S. PATENT DOCUMENTS 3,266,842  8/1966  Board et al. .
3,781,497  12/1973 Stephenson et al. .
4,060,878  12/1977 Dyki .
4,441,236  4/1984  Bron .......................................... 24/602
4,589,172  5/1986  Hoenigs et al. ......................... 24/602
4,608,469  8/1986  Doty .
4,644,616  2/1987  Ferry ........................................ 24/603
5,274,890  1/1994  Shimizu et al. ......................... 24/603
5,353,482  10/1994 Ziaylek, Jr. et al. .................... 24/603

FOREIGN PATENT DOCUMENTS 1024236  1/1978  Canada .
3215600  10/1983 Germany .
9101955  6/1991  Germany .

Primary Examiner—Victor N. Sakran
Attorney, Agent, or Firm—Tarolli, Sundheim, Covell, Tummino & Szabo

[57] ABSTRACT

A buckle for safety belts in vehicles comprises a load bearing housing in which an insertion path for receiving an insert tongue is formed. A movable latch is mounted on the housing. A casing is provided which surrounds the housing. The casing is provided with an opening at a rear side thereof remote from the insertion path. Within the casing at least one electric switch is arranged. This switch is fitted through the opening in the buckle in an already assembled condition thereof.

12 Claims, 2 Drawing Sheets

BUCKLE FOR SAFETY BELTS IN VEHICLES

TECHNICAL FIELD OF THE INVENTION

The invention relates to a buckle for safety belts in vehicles.

BACKGROUND OF THE INVENTION

Electric switches in buckle for safety belt are required in order to indicate the use condition of the safety belt (i.e. fastened or unfastened). They are operated on insertion of the insert tongue and then produce a signal, which is supplied via a cable, extending out of the casing of the buckle, to a control system. Dependent on the type of control system, different forms of switch are required. For a belt warning system it is possible to employ a normally closed or a normally open switch. For a belt warning system in combination with a belt handling device as an electric switch a change over switch is required. Finally, for an air bag inquiry system a normally closed or a normally open switch is required with two different electrical resistors. The installation of such electric switches with the associated connecting cables is presently performed in the course of the assembly of the buckle. The casing of the buckle is made in two parts and is put together only after fitting of the electric switch or switches on the housing. Such a two-part housing not only involves more complex assembly than a single-piece casing, it is also less strong mechanically and less able to prevent the ingress of dirt. While assembly of a buckle without electric switches is substantially automated, the fitting thereof with various different switch systems renders necessary separate assembly and checking steps. Moreover, handling during assembly is hindered by the presence of already existing switches with their connecting cables.

BRIEF SUMMARY OF THE INVENTION

The present invention provides a buckle for safety belts in vehicles in which assembly of the buckle and mounting of the switch are substantially simplified.

According to the invention, a buckle for safety belts in vehicles comprises a load bearing housing in which an insertion path for receiving an insert tongue is formed. A movable latch is mounted on the housing. A casing is provided which surrounds the housing. The casing is provided with an opening at a rear side thereof remote from the insertion path. Within the casing at least one electric switch is arranged. This switch is fitted through the opening in the buckle in an already assembled condition thereof. Independently of whether the buckle is fitted with an electric switch, the buckle can therefore be completely assembled and provided with a single-piece casing. The manufacture of buckles with electric switches is then not different to manufacture of buckles without switches with the result that the extra complexity required for fitting electric switches is considerably reduced.

In the case of the preferred embodiment of the invention the switch is attached to the housing of the buckle by a detent connection so that it must be merely inserted through the opening at the rear side of the casing.

Further features and advantages of the invention will be understood from the dependent claims and the following detailed description in conjunction with the accompanying drawings.

DETAILED DESCRIPTION OF PREFERRED EMBODIMENTS

Figure 1A:
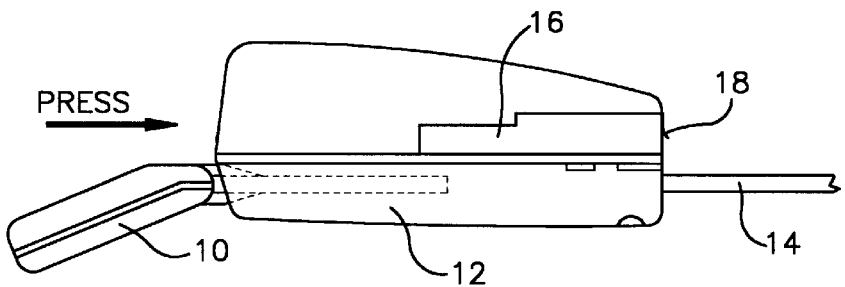
FIG. 1 diagrammatically shows a buckle for safety belts in a side view and in plan.
Figure 1B:
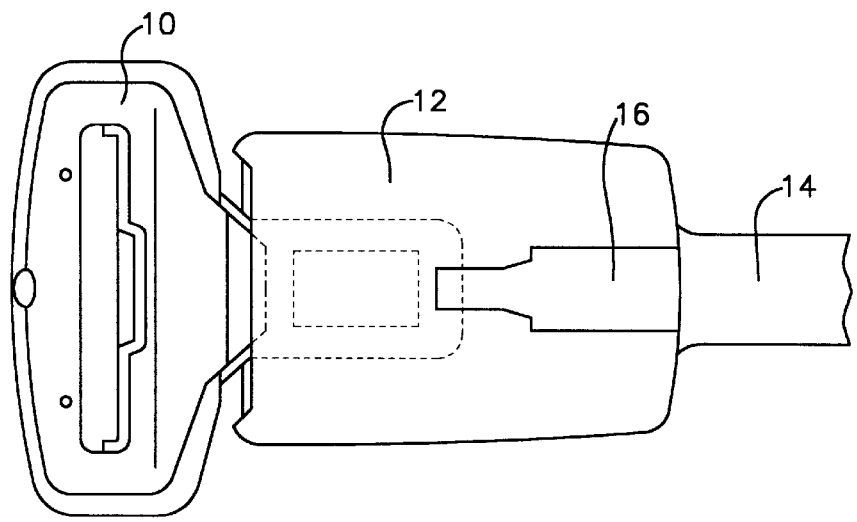

The buckle depicted in FIG. 1 is one of a conventional form, of which merely the outline is illustrated. The reader will see an insert tongue 10, a casing 12 surrounding the housing of the buckle and an attachment fitting 14. In the interior of the buckle there is a receiving space, referenced 16, for one or more electric switches. This receiving space 16 is accessible through an opening 18 at the rear side of the casing 12 remote from the insert tongue 10.

Figure 2A:
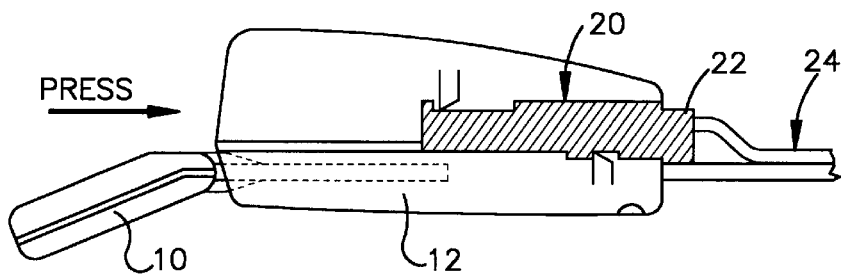
FIG. 2 diagrammatically represents the same buckle with the electric switch inserted therein.
Figure 2B:
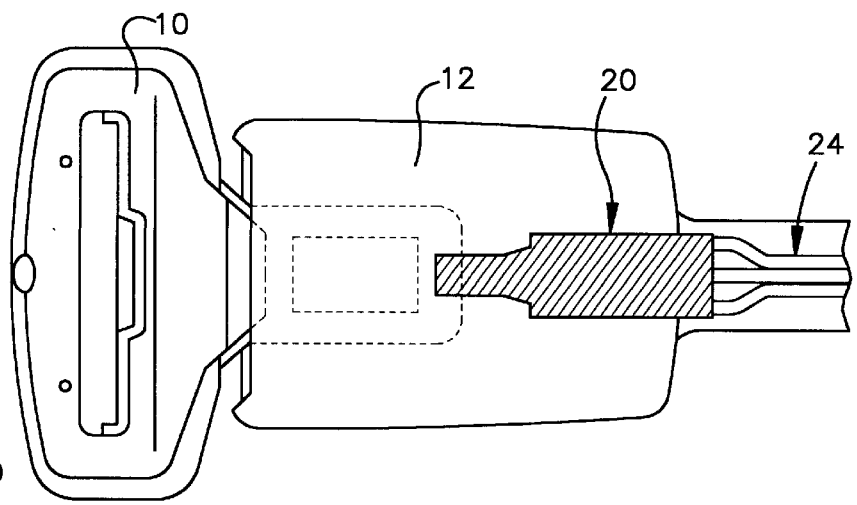

As shown in FIG. 2, an electric switch 20 can be inserted in this receiving space 16, this switch being locked at the housing by means of a detent connection which is represented diagrammatically. A block 22 serving as a tension relief means and a connecting cable emerge from the opening 18 at the rear side. It is advantageous if the switch 20 and the block 22 do not close the opening 18 at the rear side in order to enable dirt which has entered the housing of the buckle to emerge therefrom. In some cases, however, it may be advantageous to close opening 18 by means of the electric switch 20 of by an additional element.

Figure 3:
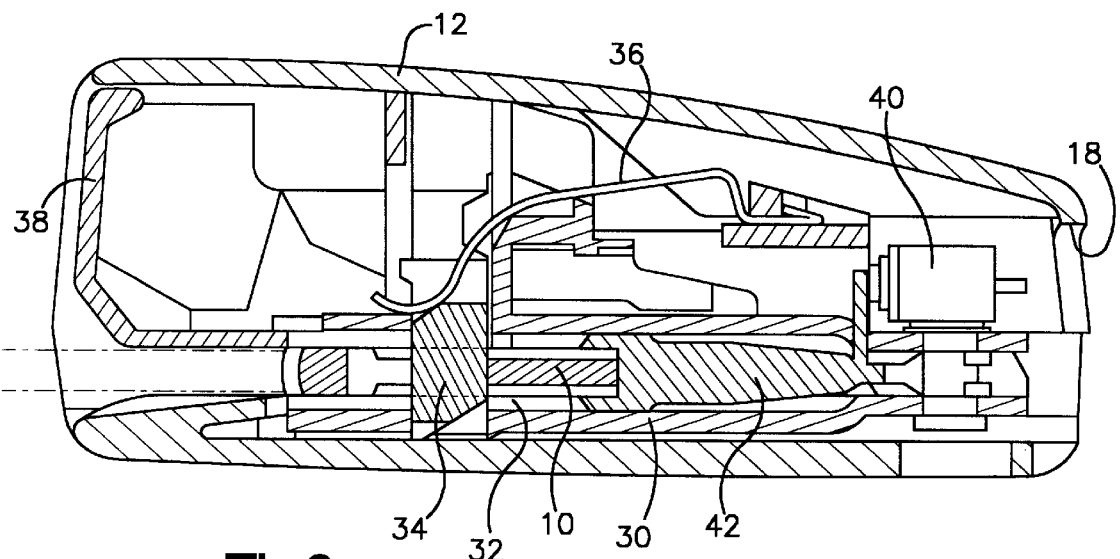
FIG. 3 is a longitudinal section of the buckle.
Figure 4:
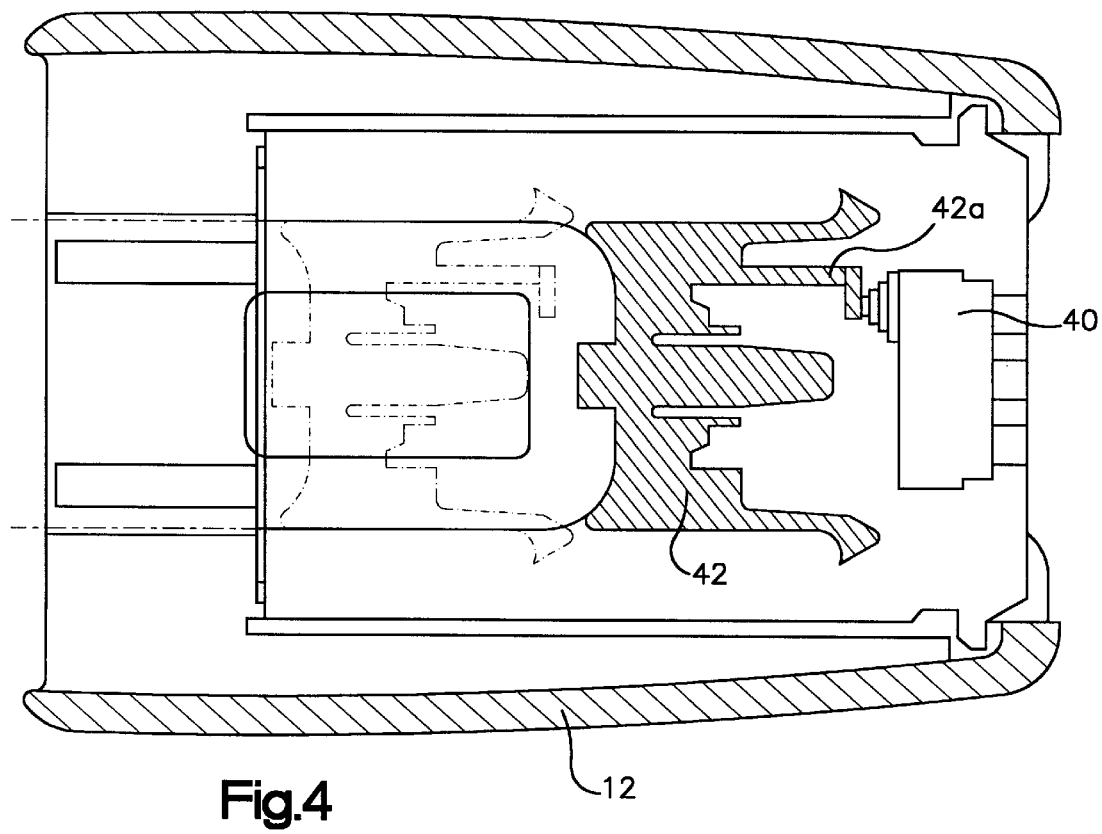
FIG. 4 is a section of the buckle taken parallel to the plan of the insertion path.

FIGS. 3 and 4 show the main functional parts of the buckle and the arrangement of an electric switch system. The buckle in conventional manner comprises a load bearing housing 30, same being formed by two parallel steel sheet metal parts. Between these sheets of the housing 30 an insertion path 32 for the insert tongue is formed. A latch 34, which is urged by a spring 36 into its shut position, is mounted for movement in the housing 30 athwart the insertion path 32. The actuation of the buckle is performed by means of a key 38 accessible from the front side of the buckle. The casing 12 surrounds the housing 30 together with the key 38 mounted thereon.

A switch system 40, inserted through the opening 18 at the rear side of the casing 12, comprises several switches which are arranged adjacent each other and which are secured to the top plate of the housing 30, preferably by means of a detent connection. An ejector 42 runs between the plates of the housing 30 so that on introduction of the insert tongue 10 into the insertion path 32 it is moved forward toward the switch system 40. An elastic actuation projecting part 42a is arranged on the ejector 42 and serves to actuate the switch system 40. The switch system can further be provided with electrical components like electrical resistors, not shown, which are mounted at the housing. In FIGS. 3 and 4 the multiple core lead for the switch system 40 is not illustrated.

I claim:

1. A buckle for safety belts in vehicles, comprising a load bearing housing in which an insertion path for receiving an insert tongue is formed, said insertion path defining a common plane, a movable latch mounted on said housing, a casing surrounding said housing and provided with an opening at a rear side thereof remote from said insertion path, and at least one electric switch arranged within said casing, said switch being fitted through said opening in said buckle in an already assembled condition thereof wherein said switch together with a connecting cable connected to it, and also a tension relief means for said cable are inserted into said opening at the rear side of said casing, said switch being arranged in its inserted condition adjacent said insertion path and offset to said common plane.

2. The buckle of claim 1, wherein a plurality of electric switches are attached to said housing grouped in superposed relationship or alongside one another.

3. The buckle of claim 1, wherein said switch is adapted to be actuated by a functional part of said buckle directly.

4. The buckle of claim 3, wherein said switch is adapted to be actuated by a projecting part on an ejector of said buckle.

5. The buckle of claim 1, wherein said opening at the rear side of said casing is shut off by said inserted switch body in a sealing fashion.

6. The buckle of claim 1, wherein said opening at the rear side of said casing remains open when said switch body is inserted.

7. The buckle of claim 1, wherein electronic components are mounted at said housing.

8. The buckle of claim 1, wherein said switch is secured to the housing by means of a detent connection.

9. The buckle according to claim 1, wherein said connecting cable is provided with a connecting means for connecting it to an electrical vehicle system and wherein said switch, said connecting cable and said tension relief means form a preassembled module.

10. The buckle according to claim 1, wherein said switch in its inserted condition is covered by said casing.

11. The buckle according to claim 1, wherein said insertion path extends from an insert orifice and defines a longitudinal direction of said buckle, said rear side of said casing lies opposite said insert orifice of said load bearing housing with respect to said longitudinal direction, and said switch together with said connecting cable and said tension relief means are inserted into said opening at the rear side of said casing in a direction parallel to said longitudinal direction.

12. A buckle for safety belts in vehicles, comprising a load bearing housing in which an insertion path for receiving an insert tongue is formed, a movable latch mounted on said housing, an ejector being movable along said insertion path from a rest position to an active position in which said insert tongue is received in the buckle, said load bearing housing having an attachment point for connecting said housing to vehicle-fixed attachment means, said attachment point being arranged adjacent said ejector in its active position, said insertion path, said ejector and said attachment point being arranged in a common plane, a casing surrounding said housing and provided with an opening at a rear side thereof remote from said insertion path, and at least one electric switch arranged within said casing, said switch being fitted through said opening in said buckle in an already assembled condition thereof wherein said switch together with a connecting cable connected to it, and also a tension relief means for said cable are inserted into said opening at the rear side of said casing, said switch being arranged in its inserted condition offset to said common plane.

* * * * *